US011244373B2

(12) United States Patent
August et al.

(10) Patent No.: US 11,244,373 B2
(45) Date of Patent: Feb. 8, 2022

(54) METHOD, SYSTEM, AND MANUFACTURE FOR PERSONALIZED VEHICLE MATCHING BASED UPON USER PREFERENCES

(71) Applicant: CARS.COM, LLC, Chicago, IL (US)

(72) Inventors: Barbara August, Addison, IL (US); Leena Ansari, Naperville, IL (US); Bree J. Radloff, Chicago, IL (US); William Ryan Page, Chicago, IL (US); David Matthew Krell, Naperville, IL (US); Michael N. Morgan, Chicago, IL (US); Sainaga Srikantham, Chicago, IL (US); Samantha Volker, Chicago, IL (US); Addhyan Pandey, Chicago, IL (US); Michael D. Heinley, Chicago, IL (US); Chirag S. Patel, Naperville, IL (US); Greg Heidorn, Oak Lawn, IL (US); Seth Goldberg, Chicago, IL (US); Dennis R. Sherman, Chicago, IL (US)

(73) Assignee: CARS.COM, LLC, Chicago, IL (US)

( * ) Notice: Subject to any disclaimer, the term of this patent is extended or adjusted under 35 U.S.C. 154(b) by 53 days.

(21) Appl. No.: 16/531,667

(22) Filed: Aug. 5, 2019

(65) Prior Publication Data
US 2020/0098032 A1 Mar. 26, 2020

Related U.S. Application Data

(60) Provisional application No. 62/735,535, filed on Sep. 24, 2018.

(51) Int. Cl.
*G06Q 30/00* (2012.01)
*G06Q 30/06* (2012.01)
(Continued)

(52) U.S. Cl.
CPC ... *G06Q 30/0631* (2013.01); *G06F 16/24578* (2019.01); *G06F 16/9535* (2019.01);
(Continued)

(58) Field of Classification Search
CPC .................. G06Q 30/00; G06Q 30/06; G06Q 30/0601–6/45; G06Q 30/0631;
(Continued)

(56) References Cited

U.S. PATENT DOCUMENTS 7,013,238 B1 * 3/2006 Weare .................... G06Q 30/02
702/182
10,475,105 B1 * 11/2019 Anderson ........... G06F 16/2457
(Continued)

OTHER PUBLICATIONS

Gevelber, Lisa. "The Car-Buying Process: One Consumer's 900+ Digital Interactions." Think with Google, Mar. 2016, www.thinkwithgoogle.com/consumer-insights/consumer-trends/consumer-car-buying-process-reveals-auto-marketing-opportunities.*
(Continued)

*Primary Examiner* — Jeffrey A. Smith
*Assistant Examiner* — Lindsey B Smith
(74) *Attorney, Agent, or Firm* — Marshall, Gerstein & Borun LLP

(57) ABSTRACT

Systems and methods for guided vehicle matching are disclosed. In order to generate vehicle recommendations for a user of an electronic vehicle listing service, a plurality of vehicle-related lifestyle options are presented to the user, and a user selection received. Additional data regarding the user's vehicle preferences, requirements, or usage may be obtained. Based upon such information, a set of example vehicles is generated and presented to the user. Each example vehicle has characteristics representing a plurality of other vehicles. Based upon user ratings or selections of at least some of the example vehicles, a plurality of vehicle recommendations for specific available vehicles are gener-
(Continued)

ated and presented to the user. In some embodiments, further user interaction with such recommendations is used to refine the vehicle recommendations and identify additional vehicle recommendations.

20 Claims, 9 Drawing Sheets

(51) Int. Cl.
*G06F 16/9538* (2019.01)
*G06Q 30/02* (2012.01)
*G06F 16/2457* (2019.01)
*G06F 16/9535* (2019.01)

(52) U.S. Cl.
CPC ..... *G06F 16/9538* (2019.01); *G06Q 30/0282* (2013.01); *G06Q 30/0623* (2013.01); *G06Q 30/0625* (2013.01); *G06Q 30/0627* (2013.01); *G06Q 30/0629* (2013.01); *G06Q 30/0641* (2013.01); *G06Q 30/0643* (2013.01)

(58) Field of Classification Search
CPC .... G06Q 30/0282; G06Q 30/08; G06F 16/00; G06F 16/90; G06F 16/95; G06F 16/953; G06F 16/9535; G06F 16/24578; G06F 16/9538
USPC ....................................... 705/26.7, 26.1–27.2
See application file for complete search history.

(56) References Cited

U.S. PATENT DOCUMENTS

| | | | | |
|---|---|---|---|---|
| 10,482,523 | B1* | 11/2019 | Price | G06Q 30/0631 |
| 10,592,961 | B1* | 3/2020 | Price | G06Q 30/0631 |
| 2008/0195435 | A1* | 8/2008 | Bentley | G06Q 30/0603 |
| | | | | 705/7.33 |
| 2014/0164188 | A1* | 6/2014 | Zabawa | G06Q 30/0625 |
| | | | | 705/26.62 |
| 2017/0004560 | A1* | 1/2017 | Rackley | G06Q 30/0631 |
| 2017/0337573 | A1* | 11/2017 | Toprak | G07C 5/006 |

OTHER PUBLICATIONS

Odell, Patty, "Tinder for Car-Shopping? Cars.Com Says Yes!", Aug. 8, 2018, chiefmarketer.com, accessed at [https://www.chiefmarketer.com/tinder-car-shopping-cars-com-says-yes/] (Year: 2018).*

* cited by examiner

○─────○─────○─────○─────○
Lifestyle   Specs   Budget   Style   Matches

What's your lifestyle?
(Select a Lifestyle)
Family Taxi

Small Family
Your cargo, passengers, and time are precious.

Big Family
Getting the crew to fit comfortably matters most.

Daily Commuter

Style and Comfort
No trade-offs in safety, gas mileage, or reliability.

Eco-Friendly
Saving fuel and the Carth is a must.

Fun and Play Companion

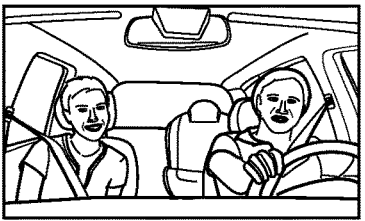

Luxury
Luxury all the way in looks, ride, and convenience.

Sun Lover
Sun and breeze all around is no daydream to you.

Work Horse

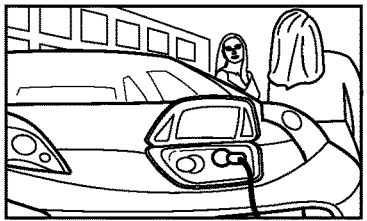

Trucks and Off-Roading
Dirt-crawling and towing power to get the job done.

FIG. 5

**What do you look for *most* in a car?**
(Select a Specification)

◉ Luxury
Driving refinement, upscale styling and prestige.

○ Best-rated for Safety
Highest IIHS crash and rollover scores.

○ Smartphone Connectivity
Has Apple CarPlay or Android Auto or both.

○ Just sow me what's popular
I have no preference.

Do you want New or Used?
(Select a Specification)

○ Used     ◉ New     ○ Bothw

[ Back ]   [ Next ]

FIG. 6

How much can you spend?

(Select a Price Range)

Min
$10,000

Max
$40,000

$10k $100k+

Where are you located?

(Enter Your ZIP Code)

ZIP Code

60004

Back | Next

FIG. 7

Meet Your Daily Commuter

These are your top matches in 60004, based on:
- ✓ Style and Comfort  ✓ New
- ✓ Luxury  ✓ Budget of $10,000-$40,000

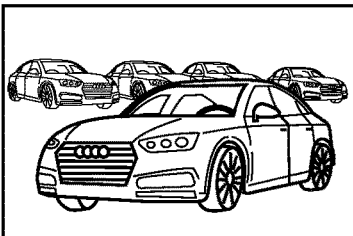

2018 Audi A4
$40,000 $40,000 NEW

♡ Save   21 miles away

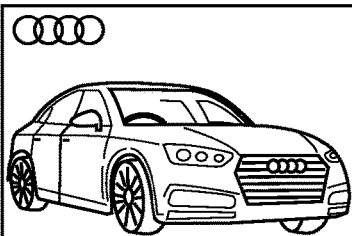

2018 Audi A4
$40,000 $40,000 NEW

♡ Save   10 miles away

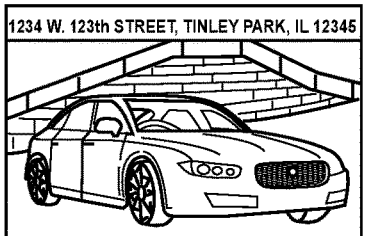

2017 Jaguar XE
$35,718 $47,718 NEW

Save   36 miles away

Keep in Touch with Your Matches

You'll need a profile to get back to your best matches.
Sign up now.

Sign Up

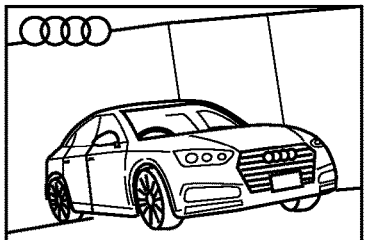

2018 Audi A4
$40,000 $40,000 NEW

♡ Save   10 miles away

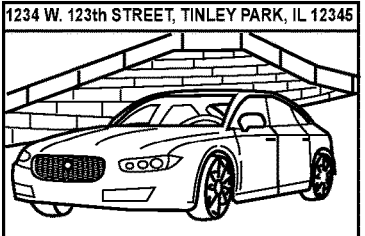

2017 Jaguar XE
$35,995 $48,108 NEW

♡ Save   36 miles away

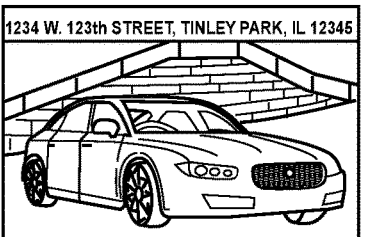

2017 Jaguar XE
$37,995 $50,208 NEW

♡ Save   36 miles away

FIG. 9

METHOD, SYSTEM, AND MANUFACTURE FOR PERSONALIZED VEHICLE MATCHING BASED UPON USER PREFERENCES

CROSS-REFERENCE TO RELATED APPLICATIONS

This application claims the benefit of U.S. Provisional Application No. 62/735,535, filed on Sep. 24, 2018, the entirety of which is incorporated herein by reference.

TECHNICAL FIELD

The present disclosure generally relates to systems and methods for improving vehicle selection and presentation to users of electronic vehicle listing services based upon revealed user preferences.

BACKGROUND

For most consumers, a vehicle purchase is a significant and infrequent investment in a durable asset, but one about which the available information can be overwhelming. Electronic vehicle listing services help consumers identify vehicles to purchase. However, an electronic vehicle listing service may list hundreds of models of vehicles over many years with various options and features, resulting in thousands of make/model/year/feature combinations. This complexity is further compounded with the addition of used vehicles, which can further differ in mileage or condition. Thus, users of such services are still left with an excessive number of options to consider. While existing electronic vehicle listing services allow users to narrow their searches by make, model, price, mileage, condition, or vehicle body type, the user must still know in advance the characteristics of the vehicle sought. Because of the relative infrequency of vehicle purchases, however, many users lack a clear definition of the vehicle characteristics they are seeking due to incomplete information regarding available vehicle options. Thus, improved methods for identifying and presenting relevant vehicles to users of electronic vehicle listing services would be useful.

SUMMARY

The present application discloses a method, system, and computer-readable medium storing instructions for guided vehicle matching. Such techniques solve the problems associated with the lack of information by users of electronic vehicle listing services and similar information systems. The method, system, or instructions may include receiving, at one or more processors of a server, a user request to generate a plurality of vehicle recommendations from a client computing device associated with a user; causing a plurality of lifestyle options associated with vehicle usage to be presented to the user at the client computing device; receiving a user lifestyle selection indicating one of the plurality of lifestyle options; obtaining additional vehicle usage data associated with vehicle preferences of the user; generating a set of example vehicles based upon the user lifestyle selection and the additional vehicle usage data; causing the set of example vehicles to be presented to the user at the client computing device; receiving user preference data regarding two or more example vehicles of the set of example vehicles; determining a plurality of preferred vehicle characteristics based upon the user preference data and characteristics of the two or more example vehicles; identifying a plurality of vehicle recommendations associated with available vehicles matching at least some of the preferred vehicle characteristics; and/or causing the plurality of vehicle recommendations to be presented to the user at the client computing device.

Each example vehicle in the set of example vehicles has characteristics representative of a plurality of vehicle models. In some embodiments, the set of example vehicles may comprise a plurality of specific vehicle models having different body types or styles. In further embodiments, the plurality of lifestyle options may include a plurality of categories relating to types of vehicle usage and subcategories relating to details associated with the types of vehicle usage.

In some embodiments, obtaining the additional vehicle usage data may comprise causing one or more additional vehicle usage options to be presented to the user at the client computing device and/or receiving one or more user selections associated with the one or more additional vehicle usage options indicating the additional vehicle usage data. Additionally, or alternatively, obtaining the additional vehicle usage data may comprise accessing the additional vehicle usage data in a user profile associated with the user based upon a user identifier.

In further embodiments, determining the plurality of preferred vehicle characteristics may comprise identifying the characteristics of the two or more example vehicles and/or generating a vehicle preferences profile for the user based upon the characteristics of the two or more example vehicles. Identifying the plurality of vehicle recommendations may include identifying a plurality of vehicle listings of an electronic vehicle listing service matching at least some of the preferred vehicle characteristics, calculating a matching score for each of the plurality of vehicle listings, and/or identifying the plurality of vehicle recommendations based upon the matching scores.

Further embodiments may additionally include refining or updating the vehicle recommendations by: receiving user reaction data indicating responses of the user to one or more of the vehicle recommendations; adjusting the plurality of preferred vehicle characteristics based upon the user reaction data; identifying a plurality of additional vehicle recommendations associated with additional available vehicles matching the preferred vehicle characteristics adjusted based upon the user reaction data; and/or causing the plurality of additional vehicle recommendations to be presented to the user at the client computing device. Such user reaction data may include data regarding user navigation through one or more pages associated with the one or more vehicle recommendations in a web site or application and/or user ratings of the one or more vehicle recommendations.

In various embodiments, additional, fewer, or alternate actions may be included or performed by the method, system, and computer-readable medium, including those discussed elsewhere herein.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 5 an exemplary lifestyle options page in accordance with the embodiments described herein;

FIG. 6 illustrates an exemplary user priority options page in accordance with the embodiments described herein;

FIG. 7 illustrates an exemplary price and location options page in accordance with the embodiments described herein;

FIG. 9 illustrates an exemplary vehicle recommendation page in accordance with the embodiments described herein.

DETAILED DESCRIPTION

The invention described herein is related to methods and systems that guide users of electronic vehicle listing services to identify the users' vehicle characteristic preferences. By obtaining user responses to options regarding user lifestyle, vehicle usage, and priorities, the systems and methods are able to generate vehicle recommendations for the user. In some embodiments, this may include obtaining user reactions to a set of example vehicles or user responses to particular vehicles. Thus, vehicle recommendations are generated and presented to users based upon user preferences, thereby reducing the information burden upon the user.

The present application discloses a method, system, and computer-readable medium storing instructions for identifying and presenting relevant vehicles to users of electronic vehicle listing services. Although exemplary systems and methods are disclosed herein, various modifications may be made to such disclosed techniques. In various embodiments, additional, fewer, or alternate actions may be included or performed by the method, system, and computer-readable medium, including those discussed elsewhere herein.

Figure 1:
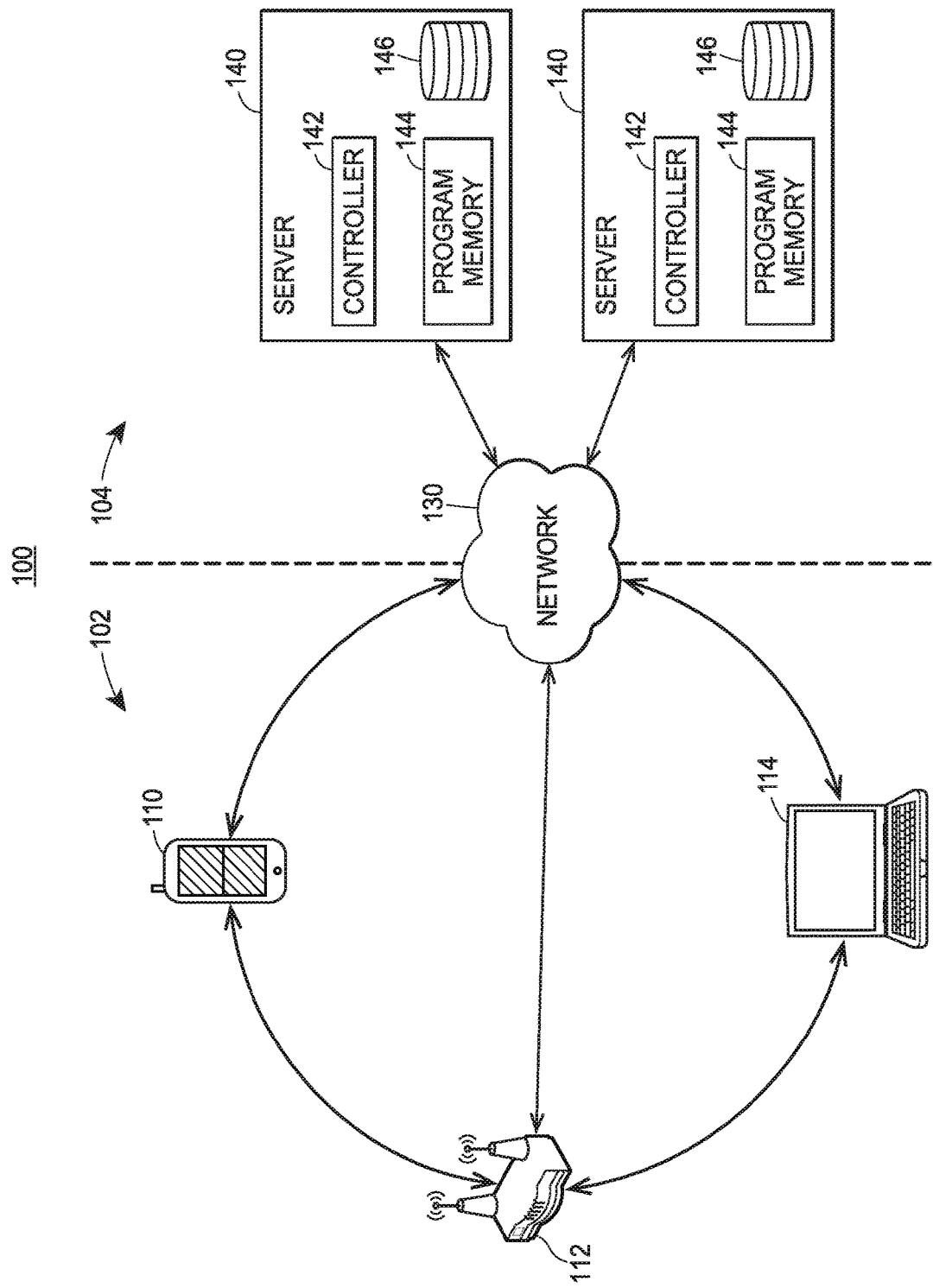
FIG. 1 illustrates a block diagram of an exemplary data system on which the methods described herein may operate in accordance with the embodiments described herein.

FIG. 1 illustrates a block diagram of an exemplary data system 100. The high-level architecture includes both hardware and software applications, as well as various data communications channels for communicating data between the various hardware and software components. The data system 100 may be roughly divided into front-end components 102 and back-end components 104. The front-end components 102 may communicate via a network 130 with the back-end components 104, as well as with other front-end components 102. For example, the front-end components 102 may include a plurality of computing systems communicatively connected to the back-end components 104 via the network 130. As illustrated, the computing systems may include one or more client computing devices 110 associated with a user (e.g., a smartphone of a customer) and one or more analyst computing device 114 associated with a reviewer or analyst of the data (e.g., a desktop computer, notebook, or tablet computer). The client computing device 110 may be used by a user to request and obtain data using one or more software programs, which data may include information regarding vehicles or vehicle dealers. The analyst computing device 114 may be used by an operator to request and review data regarding user interactions with the one or more client computing devices 110, which may be obtained by the analyst computing device 114 from one or more servers 140 via the network 130. In some embodiments, the analyst computing device 114 may instead be a back-end component 104, directly or indirectly connected to one or more servers 140. In further embodiments, the client computing devices 110 or the analyst computing devices 114 may communicate with one or more routers 112 to exchange data with each other or with the back-end components 104. Although one client computing device 110 and one analyst computing device 114 are shown, it should be understood that the data system 100 may include a plurality of each or either (e.g., hundreds or thousands of such devices). Any of the front-end components 102 may be directly or indirectly (e.g., through a router 112) connected to the network 130.

The back-end components 104 may operate in coordination with the front-end components 102 to collect, analyze, and present information. To this end, the back-end components 104 may include a server 140 that stores information received from the front-end components 102 via the network 130. The server 140 may further provide requested data to the front-end components 102, such as vehicle data or report data. In some embodiments, the back-end components 104 may include a plurality of servers 140 performing distinct or overlapping functions. For example, a first server 140 may perform user survey and/or user preference determination functions, while a second server 140 may provide data in response to user requests and store information associated with such user requests for further analysis. Alternatively, one server 140 may perform any or all of the functions described herein. Each server 140 may include a controller 142 to process data and run software programs, applications, or routines stored in a program memory 144 as executable instructions, and the server 140 may further include or be communicatively connected to a database 146 for data storage and retrieval.

The front-end components 102 may be arranged in various configurations including varying components depending upon user or analyst preferences. In some embodiments, the front-end components 102 may include a plurality of client computing devices 110 configured to access information from the server 140 via the network 130 and to communicate information to the server 140. In an exemplary embodiment described in detail herein, the front-end components 102 and back-end components 104 may be used to facilitate a vehicle research and purchase process for users, during which information regarding user interactions with the servers 140 (e.g., data requests) may be recorded for analysis, which data collection may be voluntary or may require affirmative user consent, in various embodiments. Correspondingly, the client computing devices 110 may be used to provide information to the servers 140 regarding user visits to dealerships, user research, and indications of user interest in specific vehicles or types of vehicles. Each of these client computing devices 110 may request data regarding vehicles or vehicle dealers through a general-purpose or special-purpose software application running on the device, such as from a web browser, a data service application, or a messaging application (e.g., via an automated or live communication session). The client computing devices 110 may obtain the data via the network 130 from a server 140, which server 140 may store information regarding the requests.

The server 140 may further acquire and store information regarding user requests or user locations, based upon data received from the client computing devices 110. Such data may include user data requests, user responses to information requests (e.g., survey responses), user geospatial locations, or other information associated with user activities. Such information may be processed by the server 140 to generate reports of user data interaction of users or types of users. Such reports may be generated upon receipt of requests from analyst computing devices 114.

In various embodiments, the client computing devices 110 or analyst computing devices 114 may be any known or later-developed dedicated-use or general-use mobile personal computers, cellular phones, smartphones, tablet computers, or wearable computing devices (e.g., watches, glasses, etc.). For example, the client computing device 110 may be a general use smartphone or tablet computer with a web browser. In some embodiments, the client computing device 110 may be a thin client device, wherein much or all of the computing processes are performed by the server 140, with information communicated between the thin client device and the server 140 via the network 130. The client computing device 110 may include any number of internal components and may be further communicatively connected to one or more external components by any known wired or wireless means (e.g., USB cables, Bluetooth communication, etc.). An embodiment of the client computing device 110 and analyst computing device is further discussed below with respect to FIG. 2.

One or more routers 112 may be included within the data system 100 to facilitate communication. The routers 112 may be any wired, wireless, or combination wired/wireless routers using any known or here-after developed communication protocol for general- or special-purpose computer communication. In some embodiments, the client computing devices 110 or analyst computing devices 114 may be communicatively connected to the network 130 via one or more routers 112. Wireless communication may occur by any known means, such as Bluetooth, Wi-Fi, or other appropriate radio-frequency or other communications protocols.

The front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 include one or more servers 140. Each server 140 may include one or more computer processors within the controller 142 adapted and configured to execute various software applications and routines of the data system 100 stored in the program memory 144 of the server 140, in addition to other software applications. The controller 142 may include or be connected to one or more processors (not shown), a random-access memory (RAM) (not shown), the program memory 144, and an input/output (I/O) circuit (not shown), all of which may be interconnected via an address/data bus (not shown). The RAM and program memory 144 may be implemented as semiconductor memories, magnetically readable memories, optically readable memories, or any other type of known or hereafter developed memory capable of storing executable instructions for execution by computer processors, such as the controller 142. The server 140 may further include one or more databases 146, which may be adapted to store data received from the front-end components 102, as well as data to be transmitted to the front-end components 102 (e.g., vehicle or vehicle dealer information). Such data might include, for example, information regarding vehicles listed for sale by vehicle dealers, information regarding average prices or ratings for vehicles of specified types, makes, models, or years, information regarding vehicle dealer inventory, hours, or customer ratings, or other information a customer may use in searching for or purchasing a vehicle. The server 140 may access data stored in the database 146 when executing various functions and tasks associated with the data system 100. Although referred to herein as a single database 146, multiple databases may be used in some embodiments, each of which may be relational or non-relational.

Figure 2:
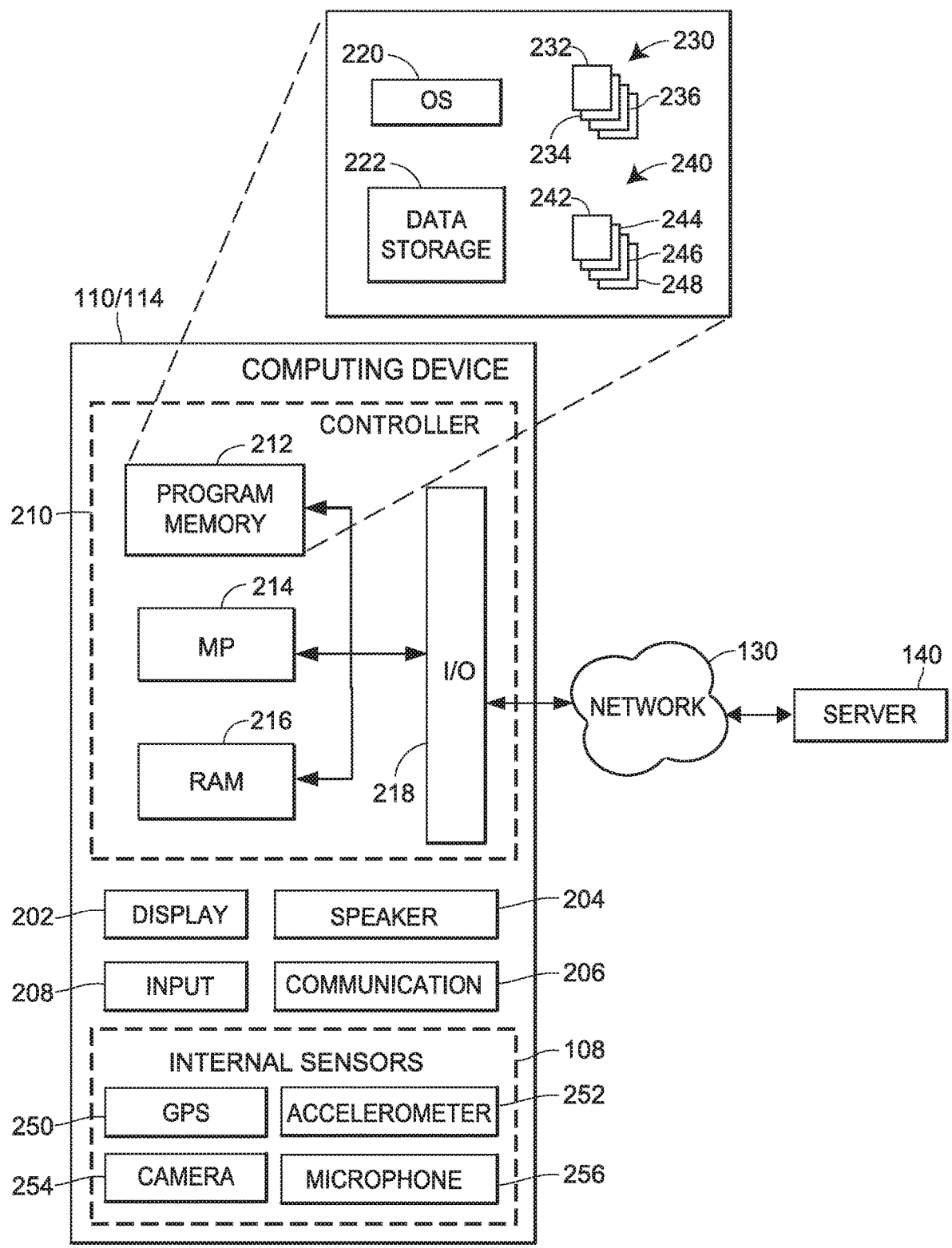
FIG. 2 illustrates a block diagram of an exemplary computing device in accordance with the embodiments described herein.

FIG. 2 illustrates a block diagram of an exemplary client computing device 110 or analyst computing device 114 in accordance with the data system 100. Any client computing device 110 or analyst computing device 114 may, in some embodiments, be a desktop computer or other computing device having additional or fewer components than the exemplary device illustrated in FIG. 2. Although the following description refers to the client computing device 110 for simplicity and clarity, it should be understood that any combination of features described herein with respect to the client computing device 110 may be included in the analyst computing device 114.

The client computing device 110 may be a desktop computer, a notebook computer, a netbook computer, a smartphone, a tablet computer, or similar mobile or stationary computing device capable of receiving and processing electronic information. In some embodiments, the client computing device 110 may include a wearable computing device or may be communicatively connected to a wearable computing device. The client computing device 110 may include one or more internal sensors 108, which may provide sensor data regarding the local physical environment or the device's location therein. Such internal sensors 108 may likewise facilitate user input to the client computing device 110, such as by enabling the user to issue voice commands via a microphone 256. The client computing device 110 may further communicate with the server 140 via the router 112 and/or the network 130 to send and receive data. The data may be processed by the controller 210 to perform various operations for the user. Additionally, or alternatively, the data may be sent to one or more processors of the server 140 through the network 130 for processing. When the controller 210 (or other processor) receives an indication of a user action or request, appropriate responses are determined and implemented. Such responses may include processing data for presentation to the user, requesting data from the server 140, processing data from other front-end components 102 or back end components 104, determining information regarding the client computing device 110, sending data to the server 140, or presenting information to the user via a display 202 or speaker 204. In some embodiments, the client computing device 110 may include a communication unit 206 to send or receive information from local or remote devices (e.g., a server 140), either directly or through the network 130. The communication unit 206 may include a wireless communication transceiver, such as a Wi-Fi or Bluetooth communication component. Further embodiments of the client computing device 110 may include one or more inputs 208 to receive instructions, selections, or other information from a user of the client computing device 110.

The client computing device 110 may include various input and output components, units, or devices. The display 202 and speaker 204, along with other integrated or communicatively connected output devices (not shown), may be used to present information to the user of the client computing device 110 or others. The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component, which may include a haptic component or device. In some embodiments, communicatively connected speakers 204 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The client computing device 110 may further include various internal sensors 108. The internal sensors 108 may include any devices or components mentioned herein, other extant or later-developed devices suitable for monitoring a physical environment (including device position or location within the environment). The sensors of the client computing device 110 may further include additional internal sensors 108 specifically configured for determining location or for tracking movement or spatial orientation of the device.

Although discussion of all possible sensors of the client computing device 110 would be impractical, if not impossible, several sensors warrant particular discussion. Disposed within the client computing device 110, the internal sensors 108 may include a GPS unit 250, an accelerometer 252, a camera 254, or a microphone 256. Any or all of these may be used to generate sensor data regarding the client computing device 110, its environment, user activity, or other relevant information. Additionally, other types of currently available or later-developed sensors may be included in some embodiments.

The GPS unit 250 or the accelerometer 252 may provide information regarding the location or movement of the client computing device 110. The GPS unit 250 may use "Assisted GPS" (A-GPS), satellite GPS, or any other suitable global positioning protocol (e.g., the GLONASS system operated by the Russian government) or system that locates the position of the client computing device 110. The accelerometer 252 may include one or more accelerometers positioned to determine the force and direction of movements of the client computing device 110.

The camera 254 may be used to capture images of vehicles or other relevant objects in the user's environment. It should be understood that one or more cameras 254 may be disposed within the client computing device 110 and configured to generate either still images or video recordings. The microphone 256 may be used to monitor sounds within the local physical environment 106. The microphone 256 may be used to record sounds or to receive voice commands from a user.

The client computing device 110 may also communicate with the router 112 or the network 130 using the communication unit 206, which may manage communication between the controller 210 and external devices. The communication unit 206 may transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, or other output from the controller 210 to one or more of the router 112, the network 130, or the server 140.

The client computing device 110 may further include a controller 210. The controller 210 may be configured to receive, process, produce, transmit, and store data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAM 216 or multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memories 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, or other data related to interaction with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the client computing device 110. Moreover, in thin-client implementations, additional processing and data storage may be provided by the server 140 via the network 130.

The software applications 230 and routines 240 may include computer-readable instructions that cause the processor 214 to implement data processing and communication functions. Thus, the software applications 230 may include a vehicle information application 232 to obtain and present information regarding vehicles and vehicle dealers, a web browser application 234 to obtain and present web-based content, or a mapping application 236 to present visual maps based upon user parameters. The software routines 240 may support the software applications 230 and may include routines such as a location routine 242 to determine a location of the client computing device 110 from GPS or other data, a communication routine 244 for communicating with the server 140 via the network 130, a data request routine 246 to allow a user to specify parameters for requesting data, and a data presentation routine 248 for generating or presenting received data to the user via the display 202. It should be understood that additional or alternative applications 230 or routines 240 may be included in the program memory 212, including other applications of the sort ordinarily stored on a mobile devices.

The data system 100 described above and illustrated in FIGS. 1-2, or parts thereof, may be used to perform the various methods discussed further below. Together, the methods described below relate to guiding a user of an electronic vehicle listing service through a preference determination procedure, to identifying vehicle recommendations based upon user preferences, and to presenting the vehicle recommendations to the user for further review. Although the methods are described with reference to vehicles and vehicle dealers, the methods may be applied to other situations in which users interact with electronic data sources.

Figure 3:
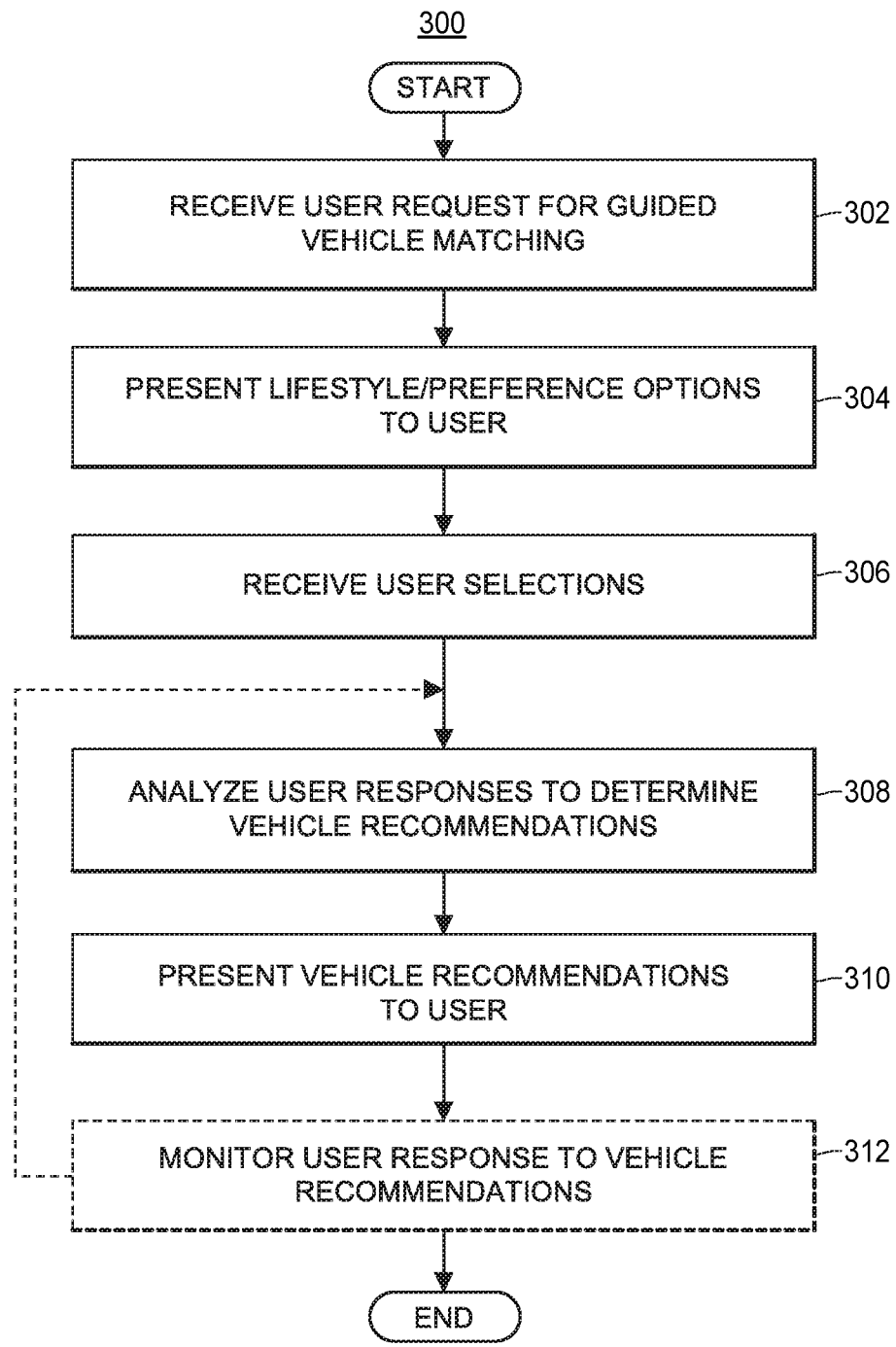
FIG. 3 illustrates a flow diagram of an exemplary vehicle matching method for determining a user preferences and presenting vehicle recommendations based upon such user preferences.

FIG. 3 illustrates a flow diagram of an exemplary vehicle matching method 300 for determining a user preferences and presenting vehicle recommendations based upon such user preferences. The method 300 may be implemented by one or more servers 140 communicating with a client computing device 110 of a user to obtain information from the user and present vehicle recommendations to the user. Such servers 140 may be executing or otherwise associated with an electronic vehicle listing service.

The exemplary vehicle matching method 300 may begin upon receipt of a user request for guided vehicle matching (block 302). In response to receiving the user request, the server may cause a plurality of lifestyle, vehicle usage, or user preference options to be presented to the user via the client computing device (block 304). Upon receiving user selections associated with the presented options (block 306), the server analyzes the user responses to determine vehicle recommendations (block 308). The server then causes the vehicle recommendations to be presented to the user via the client computing device (block 310). In some embodiments, the response of the user to the vehicle recommendations may be monitored by the server (block 312) and analyzed to determine and present further vehicle recommendations (blocks 308 and 310). In this manner, the preferences of the user may be iteratively refined based upon successive user responses to vehicle recommendations. In some embodiments, the exemplary method 300 may be modified to include alternative, additional, or fewer actions.

At block 302, the server 140 may receive a user request for guided vehicle matching from the client computing device 110 via the network 130. The request may be generated upon the user accessing a web page, selecting a link, or interacting with an application executing on the client computing device 110. Upon receiving the user request, in some embodiments, the server 140 may determine whether the user is associated with a user profile. For example, the server 140 may determine whether the user is logged into a user account. With or without a user profile, information regarding the user may be identified or requested, such as a user location.

At block 304, the server 140 may present a plurality of lifestyle or other relevant options to the user for selection. Presenting the plurality of options may include transmitting data regarding the options to the client computing device 110 via the network 130 for presentation on the display 202 of the client computing device 110. The options may include options relating to user lifestyle, vehicle usage, or vehicle preferences. The lifestyle or vehicle usage options may include categories, such as the following: family taxi (for small or large families), daily commuter (focused on style and comfort or eco-friendly commuting), fun and play companion (for luxury travel or sun lovers), or work horse (for trucks and off-roading vehicles). Other vehicle preference options may include categories of important features or types of vehicles, such as the following: luxury reputation or features, safety ratings, smartphone connectivity, popularity, or vehicle status as new or used. Pricing or budget options may also be presented to establish a user's budget, as well as location options to obtain the user's location (e.g., state, city, or zip code). In some embodiments, a plurality of example vehicles may be presented to the user for selection, as discussed further below. Presenting the various options to the user may include presenting the options in multiple stages, in some embodiments, such that the options presented at later stages depend upon user responses to options presented at previous stages.

At block 306, the server 140 may receive user selections or other responses associated with the presented options from the client computing device 110 via the network 130. The user selections may include one or more selections of presented lifestyle options, usage options, vehicle preference options, pricing options, location options, or other options. In some embodiments, the user selections may include user responses entered by the user, such as a zip code or price range. In further embodiments, the user selections may include selections or ratings of example vehicles, which may be particular types models or more general types of vehicles. Based upon the received user selections or other responses, the server 140 may identify and present vehicle recommendations to the user.

At block 308, the server 140 may analyze the received user responses to determine vehicle recommendations for the user. Such vehicle recommendations may be generated by the server 140 as best-matching vehicle listing entries or vehicle pages associated with particularly identifiable vehicles a specific locations (i.e., vehicle listings with the highest matching scores based upon the user data). In some embodiments, this may include predicting preferred vehicle characteristics for the user based upon the user responses (and other relevant user data when available), then identifying vehicles best matching the preferred vehicle characteristics. In other embodiments, the analysis may directly predict user preference matches for individual vehicle listings based upon the user responses. To determine vehicle recommendations for the user, the server 140 may apply a machine learning model, which has previously been trained. In some embodiments, such machine learning model may be an adaptive model configured to use further user responses to the vehicle recommendations to generate additional vehicle recommendations.

At block 310, the server 140 may present the vehicle recommendations to the user, which may include transmitting the vehicle recommendations to the client computing device 110 via the network 130 for presentation to the user on display 202. The vehicle recommendations may be presented to the user as a ranked list, as an unranked collection, as a sequence of vehicle pages, or in any other convenient manner. In some embodiments, an indication of the quality of each vehicle recommendation (e.g., a matching score) may be presented to the user as part of each vehicle recommendation. In further embodiments, a user-selectable feedback option (e.g., plus/minus buttons, thumbs-up/thumbs-down buttons, or sentiment sliders) may be presented with each vehicle recommendation to obtain user reaction data associated with the vehicle recommendations.

At block 312, in some embodiments, the server 140 may further monitor user response to the vehicle recommendations. In some embodiments, such monitoring may include receiving user reaction data from the user directly rating the user's reaction (e.g., positive or negative) to a recommended vehicle listing. In further embodiments, such monitoring may include tracking user navigation of a web site or application (e.g., user click-through rate or time on vehicle pages). The monitored user responses may then be further analyzed by the server 140 to determine additional vehicle recommendations (block 308) to be presented to the user (block 310). Thus, the vehicle recommendations may be further refined for the particular user based upon the user's observed interest in previously presented vehicle recommendations.

Figure 4:
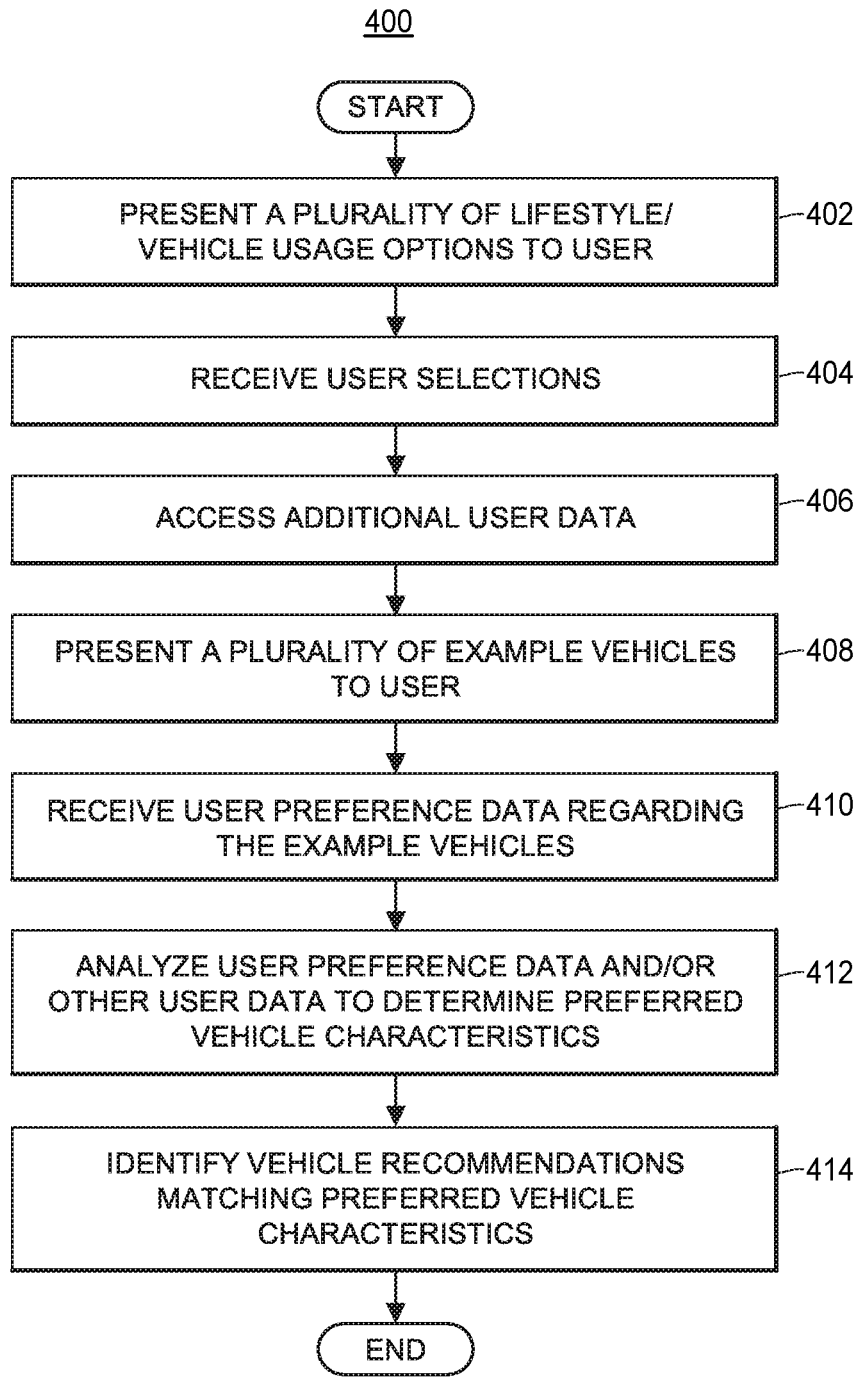
FIG. 4 illustrates a flow diagram of an exemplary vehicle recommendation generation method for identifying user preferences and vehicle recommendations.

FIG. 4 illustrates a flow diagram of an exemplary vehicle recommendation generation method 400 for identifying user preferences and vehicle recommendations. The vehicle recommendation generation method 400 may be implemented as part of the vehicle matching method 300, discussed above. Likewise, the method 400 may be implemented by one or more servers 140 communicating with a client computing device 110 of a user to present information to the user and receive information from the user in order to generate vehicle recommendations. Such servers 140 may be executing or otherwise associated with an electronic vehicle listing service.

The exemplary vehicle recommendation generation method 400 may begin by presenting a plurality of lifestyle or vehicle usage options to the user (block 402). Upon receiving user selections of one or more of the presented options (block 404), the server may, in some embodiments, combine the user selection data with additional user data from additional data sources (block 406). A plurality of example vehicles may be presented to the user based at least in part upon the user selection data (block 408). User preference data regarding the example vehicles may be received (block 410) and analyzed to determine preferred vehicle characteristics of the user (block 412). From such preferred vehicle characteristics, vehicle recommendations may be identified for presentation to the user (block 414). In some embodiments, the exemplary method 400 may be modified to include alternative, additional, or fewer actions.

At block 402, the server 140 may present a plurality of lifestyle or vehicle usage options to the user for selection, which may include sending data representing the plurality of options to the client computing device 110 of the user via the network 130. Other vehicle preference options may also be presented to the user, such as user priority options, pricing options, location options, or other options regarding the user's general vehicle preferences and requirements. The options may be presented to the user as one set of selectable options or as a series of sets of selectable options (e.g., pages containing sets of options in stages). Lifestyle or usage options may include general categories of uses for vehicles, such as family transportation, commuting, leisure, or work. FIG. 5 illustrates an exemplary lifestyle options page, presenting a plurality of selectable lifestyle options to the user. Such lifestyle options may be grouped into categories, with subcategories within the categories (e.g., subcategories "Small Family" and "Big Family" within the category "Family Taxi"). User priority options may include options regarding vehicle features or characteristics that are important to the user, such as luxury reputation or features, safety ratings, smartphone connectivity, popularity, or vehicle status as new or used. FIG. 6 illustrates an exemplary user priority options page, presenting a set of vehicle features for user selection and options regarding whether the user prefers new or used vehicles. FIG. 7 illustrates an exemplary price and location options page, presenting the user with a limited set of price range options and a text box for the user to enter a zip code. In further embodiments, additional, fewer, or alternative options may be presented to the user.

Returning to FIG. 4, at block 404, the server 140 may receive user selections or other responses to the plurality of options presented to the user, which may include receive data indicating user responses from the client computing device 110 via the network 130 in response to the user indicating selections or responses using the input 208. In embodiments in which options are presented to the user in several stages, the selections or responses received from the user for a stage may be used to determine the options presented to the user at a subsequent stage.

At block 406, in some embodiments, the server 140 may access additional user data from a data source, such as a database 146. Such additional user data may include user profile data for a user who has registered and completed a user profile. Such additional data may include information such as user location, age, income, typical vehicle use, typical miles driven annually, number of persons in the user's household, number or types of vehicles owned by the user, or other relevant information previously provided by the user.

Figure 8:
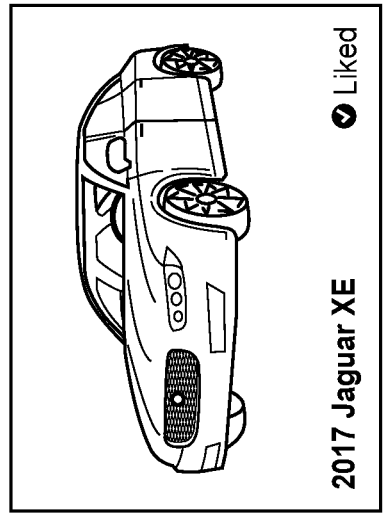
FIG. 8 illustrates an exemplary vehicles page in accordance with the embodiments described herein.

At block 408, the server 140 may present a plurality of example vehicles to the user, which may include sending data representing the plurality of example vehicles to the client computing device 110 of the user via the network 130. Such example vehicles may be particular vehicle models representative of different styles or types of vehicles. For example, specific vehicle models having different body types, profiles, or stylistic characteristics may be chosen for presentation to the user in order to represent a larger group of vehicle models based upon examples of each group. Alternatively, the plurality of example vehicles may be expressly generic types or styles of vehicles, each representing a plurality of vehicle models. In further embodiments, the example vehicles may be particular vehicles within an electronic vehicle listing server presented to the user for review, in which case the user's responses to the particular vehicle listings may be used to further refine vehicle recommendations. FIG. 8 illustrates an exemplary vehicles page, presenting the user with a plurality of exemplary vehicles for selection. Each exemplary vehicle is presented together with an option for the user to select the vehicle (i.e., a "like" button). The user may select any two or more of the exemplary vehicles to indicate the user's preferences from among the types of vehicles presented.

Returning to FIG. 4, at block 410, the server may receive user preference data regarding the example vehicles, which may include receiving data from the client computing device 110 via the network 130. Such user preference data may include user reaction data from a user action, such as rating the example vehicles (e.g., selecting a "like" option for some vehicles). Additionally, or alternatively, the user preference data may include observed behavior of the user, such as user actions to view more information regarding an example vehicle (e.g., by visiting a vehicle page associated with the example vehicle or expanding a data section to view more detailed information regarding the example vehicle).

At block 412, the server 140 may analyze the user preference data to determine preferred vehicle characteristics. In some embodiments, additional user data may also be analyzed to determine the preferred vehicle characteristics, if available. The preferred vehicle characteristics may include characteristics such as the following: vehicle body type, vehicle size, transmission type, color, price, style, safety features, information features, entertainment features, comfort features, safety rating, reliability rating, fuel efficiency, or other characteristics of vehicles. In some embodiments, mileage of used vehicles or distance from the user may also be determined as preferred vehicle characteristics for the user. In further embodiments, a vehicle preferences profile may be generated for the user, which vehicle preferences profile may include information regarding preferred vehicle characteristics based upon the user's selections and actions. Such vehicle preferences profile or other preferred vehicle characteristics may be adjusted or updated based upon further user interactions (e.g., vehicle pages visited by the user), in some embodiments.

At block 414, the server 140 may identify vehicle recommendations for the user by matching available vehicles with the preferred vehicle characteristics. For example, the server 140 may identify a subset of vehicle listings or entries in an electronic vehicle listing service that match the preferred vehicle characteristics. In some embodiments, determining whether a vehicle matches the preferred vehicle characteristics may include calculating a matching score for the vehicle based upon the matches between the vehicle characteristics and the preferred vehicle characteristics. Such matching scores may then be ranked, or a minimum score threshold may be used to identify vehicle recommendations that best match the user's preferences.

In some embodiments, the vehicle recommendations may further be presented to the user for review. For example, a set of the best-matching vehicles (e.g., vehicles having the highest matching scores for the user's preferred vehicle characteristics) may be presented to the user. FIG. 9 illustrates an exemplary vehicle recommendation page, presenting a plurality of vehicle recommendations to the user. Each vehicle recommendation indicates a particular vehicle available for purchase or lease at a specific location. Summary information regarding each vehicle (e.g., vehicle make, model, price, and distance from the user) is presented to the user, together with a picture of the vehicle. The user may select a vehicle recommendation to obtain further details regarding the vehicle, such as by accessing a vehicle page for the specific vehicle.

Other Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the foregoing text sets forth a detailed description of numerous different embodiments, it should be understood that the legal scope of the invention is defined by the words of the claims set forth at the end of this patent. The particular features, structures, or characteristics of any specific embodiment may be combined in any suitable manner and in any suitable combination with one or more other embodiments, including the use of selected features without corresponding use of other features. It is to be understood that other variations and modifications of the embodiments of the present invention described and illustrated herein are possible in light of the teachings herein and are to be considered part of the spirit and scope of the present invention. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A computer-implemented method for guided vehicle matching, comprising:

receiving, at one or more processors of a server, a user request to generate a plurality of vehicle recommendations from a client computing device associated with a user;

causing, by the one or more processors of the server, a plurality of lifestyle options associated with vehicle usage to be presented to the user on an interface of the client computing device;

receiving, at the one or more processors of the server, a user lifestyle selection indicating one of the plurality of lifestyle options;

obtaining, by the one or more processors of the server, additional vehicle usage data associated with vehicle preferences of the user;

applying, by the one or more processors of the server, an adaptive trained machine learning model to the user lifestyle selection and the additional vehicle data to determine a set of example vehicles from an electronic vehicle listing service for presentation to the user, wherein each example vehicle in the set of example vehicles is a specific vehicle from the electronic vehicle listing service and wherein each respective specific vehicle is representative of a group of a plurality of vehicle models of a corresponding type of vehicles each having a set of vehicle characteristics defining the type;

automatically updating, by the one or more processors of the server in communication with the client device, the interface of the client computing device to present the set of example vehicles as representatives of the corresponding groups of types of vehicles to the user at a display of the client computing device, wherein a user-selectable feedback option indicating a user response is presented for each of the example vehicles;

receiving, via a first user-selectable feedback option displayed at the client computing device, a first user response indicating affirmative user preference for a first example vehicle of the set of example vehicles;

receiving, via a second user-selectable feedback option displayed at the client computing device, a second user response indicating affirmative user preference for a second example vehicle of the set of example vehicles;

receiving, at the one or more processors of the server, a set of user preference data including user responses indicating affirmative user preferences for two or more example vehicles of the set of example vehicles via the user-selectable feedback options, including at least the first user response and the second user response;

identifying, by the one or more processors of the server, characteristics of the two or more example vehicles based upon the user responses;

determining, by the one or more processors of the server, a plurality of preferred vehicle characteristics based upon the set of user preference data and the characteristics of the two or more example vehicles;

applying, by the one or more processors of the server, the adaptive trained machine learning model to the plurality of preferred vehicle characteristics, the user lifestyle selection, and the additional vehicle data to determine a plurality of refined vehicle recommendations associated with available vehicles from the electronic vehicle listing service matching at least some of the preferred vehicle characteristics; and automatically updating, by the one or more processors of the server, the interface of the client computing device to present the plurality of refined vehicle recommendations to the user at the client computing device.

2. The computer-implemented method of claim 1, wherein the plurality of lifestyle options include a plurality of categories relating to types of vehicle usage and subcategories relating to details associated with the types of vehicle usage.

3. The computer-implemented method of claim 1, wherein obtaining the additional vehicle usage data comprises:

causing, by the one or more processors of the server, one or more additional vehicle usage options to be presented to the user at the client computing device; and receiving, by the one or more processors of the server, one or more user selections associated with the one or more additional vehicle usage options indicating the additional vehicle usage data.

4. The computer-implemented method of claim 1, wherein obtaining the additional vehicle usage data comprises:

accessing, by the one or more processors of the server, the additional vehicle usage data in a user profile associated with the user based upon a user identifier.

5. The computer-implemented method of claim 1, wherein the set of example vehicles comprises a plurality of different body types or styles.

6. The computer-implemented method of claim 1, wherein determining the plurality of preferred vehicle characteristics comprises:

generating, by the one or more processors of the server, a vehicle preferences profile for the user based upon the characteristics of the two or more example vehicles.

7. The computer-implemented method of claim 1, wherein determining the plurality of refined vehicle recommendations includes:

ranking, by the one or more processors of the server, the plurality of refined vehicle recommendations based upon scores generated by the adaptive trained machine learning model and associated with the plurality of vehicle listings.

8. The computer-implemented method of claim 1, further comprising:

receiving, at the one or more processors of the server, user reaction data indicating responses of the user to one or more of the refined vehicle recommendations;

adjusting, by the one or more processors of the server, the plurality of preferred vehicle characteristics based upon the user reaction data;

applying, by the one or more processors of the server, the adaptive trained machine learning model to the plurality of preferred vehicle characteristics, the user lifestyle selection, and the adjusted additional vehicle data to determine a plurality of additional refined vehicle recommendations associated with additional available vehicles from the electronic vehicle listing service matching the preferred vehicle characteristics adjusted based upon the user reaction data; and automatically updating, by the one or more processors of the server, the interface of the client computing device to be updated to present the plurality of additional refined vehicle recommendations to the user at the client computing device.

9. The computer-implemented method of claim 8, wherein the user reaction data includes data regarding user navigation through one or more pages associated with the one or more refined vehicle recommendations in a web site or application.

10. The computer-implemented method of claim 8, wherein the user reaction data includes user ratings of the one or more refined vehicle recommendations.

11. A computer system for guided vehicle matching, comprising:
one or more processors;
a program memory coupled to the one or more processors and storing executable instructions that, when executed by the one or more processors, cause the computer system to:
receive a user request to generate a plurality of vehicle recommendations from a client computing device associated with a user;
cause a plurality of lifestyle options associated with vehicle usage to be presented to the user on an interface of the client computing device;
receive a user lifestyle selection indicating one of the plurality of lifestyle options;
obtain additional vehicle usage data associated with vehicle preferences of the user;
an adaptive trained machine learning model to the user lifestyle selection and the additional vehicle data to determine a set of example vehicles from an electronic vehicle listing service for presentation to the user, wherein each example vehicle in the set of example vehicles is a specific vehicle from the electronic vehicle listing service and wherein each respective specific vehicle is representative of a group of a plurality of vehicle models of a corresponding type of vehicles each having a set of vehicle characteristics defining the type;
automatically update the interface of the client computing device to present the set of example vehicles as representatives of the corresponding groups of types of vehicles to the user at the client computing device, wherein a user-selectable feedback option indicating a user response is presented for each of the example vehicles;
receive a set of user preference data indicating user responses indicating affirmative user preference for two or more example vehicles of the set of example vehicles via the user-selectable feedback options, including at least (i) a first user response indicating affirmative user preference for a first example vehicle of the set of example vehicles via a first user-selectable feedback option displayed at the client computing device and (ii) a second user response indicating affirmative user preference for a second example vehicle of the set of example vehicles via a second user-selectable feedback option displayed at the client computing device;
identify characteristics of the two or more example vehicles based upon the user responses;
determine a plurality of preferred vehicle characteristics based upon the set of user preference data and the characteristics of the two or more example vehicles;
apply the adaptive trained machine learning model to the plurality of preferred vehicle characteristics, the user lifestyle selection, and the additional vehicle data to determine a plurality of refined vehicle recommendations associated with available vehicles from the electronic vehicle listing service matching at least some of the preferred vehicle characteristics; and
automatically updated the interface of the client computing device to present the plurality of refined vehicle recommendations to the user at the client computing device.

12. The computer system of claim 11, wherein the set of example vehicles comprises a plurality of different body types or styles.

13. The computer system of claim 11, wherein the executable instructions that cause the computer system to determine the plurality of preferred vehicle characteristics cause the computer system to:
generate a vehicle preferences profile for the user based upon the characteristics of the two or more example vehicles.

14. The computer system of claim 11, wherein the executable instructions that cause the computer system to determine the plurality of refined vehicle recommendations cause the computer system to:
rank the plurality of refined vehicle recommendations based upon scores generated by the adaptive trained machine learning model and associated with the plurality of vehicle listings.

15. The computer system of claim 11, wherein the executable instructions further cause the computer system to:
receive user reaction data indicating responses of the user to one or more of the refined vehicle recommendations;
adjust the plurality of preferred vehicle characteristics based upon the user reaction data;
apply the adaptive trained machine learning model to the plurality of preferred vehicle characteristics, the user lifestyle selection, and the adjusted additional vehicle data to determine a plurality of additional refined vehicle recommendations associated with additional available vehicles from the electronic vehicle listing service matching the preferred vehicle characteristics adjusted based upon the user reaction data; and
automatically updated the interface of the client computing device to present the plurality of additional refined vehicle recommendations to the user at the client computing device.

16. A tangible, non-transitory computer-readable medium storing executable instructions for guided vehicle matching that, when executed by one or more processors of a computer system, cause the computer system to:
receive a user request to generate a plurality of vehicle recommendations from a client computing device associated with a user;
cause a plurality of lifestyle options associated with vehicle usage to be presented to the user on an interface of the client computing device;
receive a user lifestyle selection indicating one of the plurality of lifestyle options;
obtain additional vehicle usage data associated with vehicle preferences of the user;
an adaptive trained machine learning model to the user lifestyle selection and the additional vehicle data to determine a set of example vehicles from an electronic vehicle listing service for presentation to the user, wherein each example vehicle in the set of example vehicles is a specific vehicle from the electronic vehicle listing service and wherein each respective specific vehicle is representative of a group of a plurality of vehicle models of a corresponding type of vehicles each having a set of vehicle characteristics defining the type;

automatically update the interface of the client computing device to present the set of example vehicles as representatives of the corresponding groups of types of vehicles to the user at the client computing device, wherein a user-selectable feedback option indicating a user response is presented for each of the example vehicles;

receive a set of user preference data including user responses indicating affirmative user preference for two or more example vehicles of the set of example vehicles via the user-selectable feedback options, including at least (i) a first user response indicating affirmative user preference for a first example vehicle of the set of example vehicles via a first user-selectable feedback option displayed at the client computing device and (ii) a second user response indicating affirmative user preference for a second example vehicle of the set of example vehicles via a second user-selectable feedback option displayed at the client computing device;

identify characteristics of the two or more example vehicles based upon the user responses;

determine a plurality of preferred vehicle characteristics based upon the set of user preference data and the characteristics of the two or more example vehicles;

apply the adaptive trained machine learning model to the plurality of preferred vehicle characteristics, the user lifestyle selection, and the additional vehicle data to determine a plurality of refined vehicle recommendations associated with available vehicles from the electronic vehicle listing service matching at least some of the preferred vehicle characteristics; and automatically updated the interface of the client computing device to present the plurality of refined vehicle recommendations to the user at the client computing device.

17. The tangible, non-transitory computer-readable medium of claim 16, wherein the set of example vehicles comprises a plurality of different body types or styles.

18. The tangible, non-transitory computer-readable medium of claim 16, wherein the executable instructions that cause the computer system to determine the plurality of preferred vehicle characteristics cause the computer system to:

generate a vehicle preferences profile for the user based upon the characteristics of the two or more example vehicles.

19. The tangible, non-transitory computer-readable medium of claim 16, wherein the executable instructions that cause the computer system to determine the plurality of refined vehicle recommendations cause the computer system to:

rank the plurality of refined vehicle recommendations based upon scores generated by the adaptive trained machine learning model and associated with the plurality of vehicle listings.

20. The tangible, non-transitory computer-readable medium of claim 16, further storing executable instructions that cause the computer system to:

receive user reaction data indicating responses of the user to one or more of the refined vehicle recommendations;

adjust the plurality of preferred vehicle characteristics based upon the user reaction data;

apply the adaptive trained machine learning model to the plurality of preferred vehicle characteristics, the user lifestyle selection, and the adjusted additional vehicle data to determine a plurality of additional refined vehicle recommendations associated with additional available vehicles from the electronic vehicle listing service matching the preferred vehicle characteristics adjusted based upon the user reaction data; and automatically updated the interface of the client computing device to present the plurality of additional refined vehicle recommendations to the user at the client computing device.

* * * * *